(12) United States Patent
Babarik

(10) Patent No.: US 7,273,171 B2
(45) Date of Patent: Sep. 25, 2007

(54) TRANSPORTATION SYSTEM OF PERSONS AND GOODS WITH CHECKING OUT

(76) Inventor: Norbert Babarik, Sportova 8/50, 979 01, Rimavska Sobota (SK)

( * ) Notice: Subject to any disclaimer, the term of this patent is extended or adjusted under 35 U.S.C. 154(b) by 93 days.

(21) Appl. No.: 10/542,627

(22) PCT Filed: Jan. 17, 2003

(86) PCT No.: PCT/SK03/00001

§ 371 (c)(1),
(2), (4) Date: Jul. 18, 2005

(87) PCT Pub. No.: WO2004/066222

PCT Pub. Date: Aug. 5, 2004

(65) Prior Publication Data

US 2006/0076407 A1    Apr. 13, 2006

(51) Int. Cl.
G07B 15/02 (2006.01)
G06Q 10/00 (2006.01)
G01C 21/34 (2006.01)

(52) U.S. Cl. .............................. 235/384; 705/5; 705/6

(58) Field of Classification Search ................. 235/375, 235/384; 705/13, 5, 6
See application file for complete search history.

(56) References Cited

U.S. PATENT DOCUMENTS 5,912,981 A * 6/1999 Hansmire et al. ........... 382/116
6,085,976 A * 7/2000 Sehr ........................... 235/384
6,119,095 A * 9/2000 Morita ........................... 705/5
6,335,688 B1 * 1/2002 Sweatte ................... 340/573.1
6,609,658 B1 * 8/2003 Sehr ........................... 235/384
6,609,659 B2 * 8/2003 Sehr ........................... 235/384
2006/0059023 A1 * 3/2006 Mashinsky ..................... 705/5

* cited by examiner

Primary Examiner—Thien M. Le
Assistant Examiner—April Taylor
(74) Attorney, Agent, or Firm—Louis Ventre, Jr.

(57) ABSTRACT

A method for managing the operation of a transportation system for persons or goods implemented by a single administrative office (11). Participants operating or using the transportation system are registered. Identity confirming information is obtained and identification documentation is provided to each registrant. Any registered person may make a reservation for transportation services. A security check of each registered person is made. One or more transporters (14) is then chosen. Selections are then made among chosen transporters when more than one chosen transporter is suitable. The transporter is notified to confirm acceptance of the order by the passenger or shipper. The passenger or shipper is then notified of the transporter and conditions for such transportation services. Finally, payment is received for the transportation services, which may then be conveyed to the transporter.

8 Claims, 1 Drawing Sheet

Picture No. 1

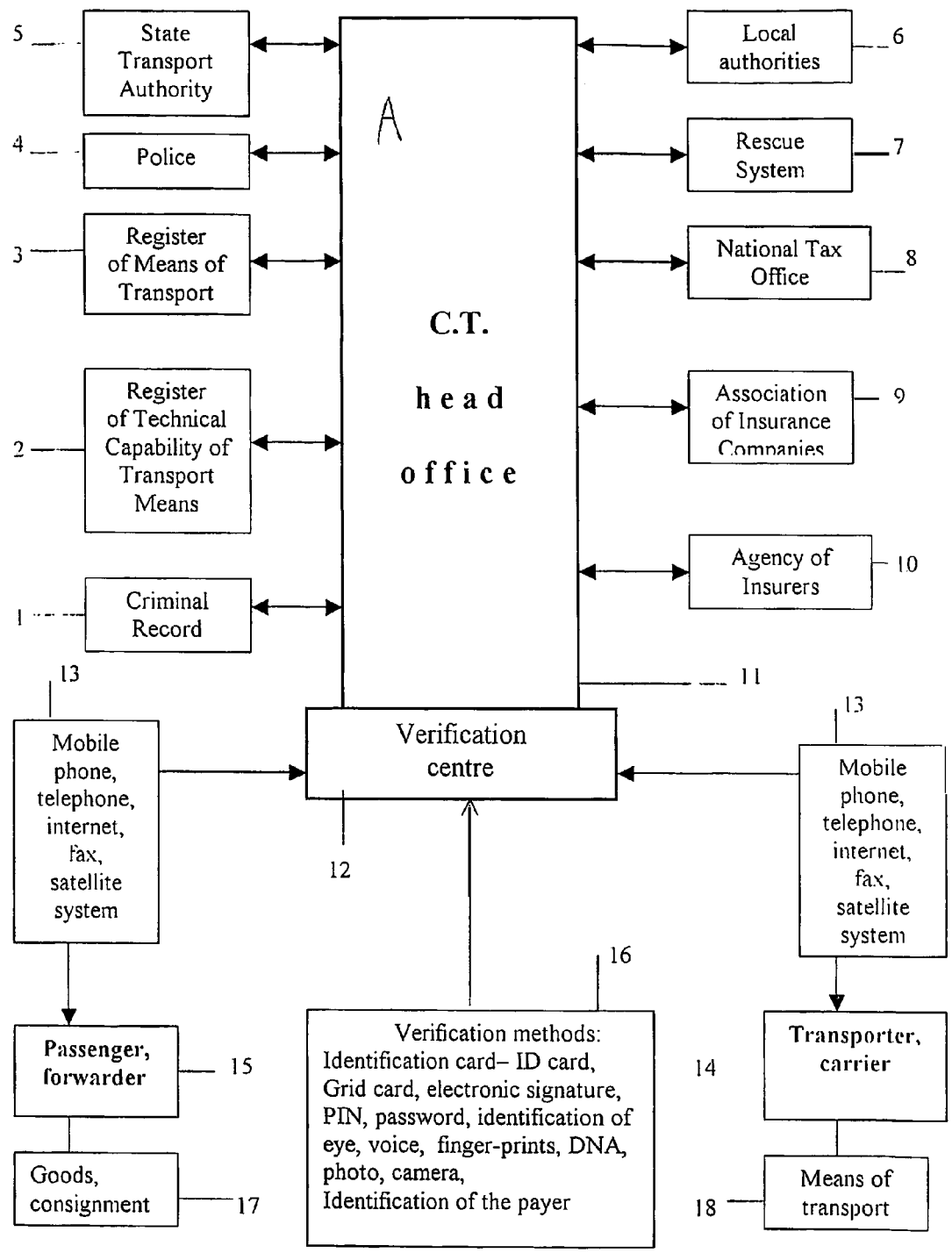
Picture No. 1

TRANSPORTATION SYSTEM OF PERSONS AND GOODS WITH CHECKING OUT

FIELD OF INVENTION

In the field of transportation services, a method is disclosed in which a single administrative office manages the operation of a transportation system for persons or goods while enhancing security and efficiency.

BACKGROUND AND DESCRIPTION OF RELATED ART

Transport services typically involve all means of land, sea and air transportation, such as automotive carriage, airplanes, ships and rail. Passenger transportation is sometimes referred to as carriage transport. Shipment of goods refers to transporting everything other than persons and is sometimes referred to as a consignment. The present invention has application to greatly improving efficiency in managing and providing any kind of transport or transportation-related services. The most common application for the invention is in managing and providing for the transportation of persons or goods. For simplicity, the terms "persons or goods" or "passengers or goods" are equivalent and intended to include the terms "persons and goods" and passengers and goods," respectively.

Transport companies are broadly defined to include those persons providing transportation services for passengers or goods, that is carriage transport and/or consignments. Transport companies are also known as forwarding agencies, which may own or rent the vehicles, which broadly include trucks, buses, automobiles, ships, trains airplanes, etc., used for each mode of transportation. Transport companies typically offer transportation services at a fixed price or at a price determined by a fare schedule. Persons desiring transport services either as a passenger or to ship goods typically select from the routes, times, and prices offered by these companies.

By utilizing a combined or centralized management system, the preferred embodiment of the present invention makes all modes of transportation more efficient. By centralizing safety, security and background information and employing that information for each sale of transportation services, the preferred embodiment promotes traffic safety and obedience to transport rules and regulations. Such centralized management enables monitoring the technical operation and equipment used to provide transportation services, and this will also improve safety. Monitoring, in turn, improves the delivery of the transportation service and its reliability for persons using the services.

The preferred embodiment of the present invention serves passengers by empowering them to efficiently select from a variety of transport services, which are often available in densely populated areas. It offers persons the capability to identify the fastest transportation services available to reach the destination for them or for their goods being shipped. It enables customer feedback to a responsive organization, that is, the single administrative office, for example to contribute to the transport safety by means of their observations and remarks. Passenger and transport company registration provides a high level of security both in the identity of the passenger and the transport company employees providing service. The preferred embodiment provides a higher level of service for persons not satisfied with the standard transport and its benefits. It enables effective choices from among a myriad of transportation services in densely populated areas to avoid wasted time in traffic jams. The greater efficiency offered by the invention translates to reduced customer expenses for transport.

The preferred embodiment of the present invention serves the transport industry by implementing superior management and assignment of equipment used to deliver transportation services. It maximizes the capacity for transport, which also reduces the impact on the environment due and creates opportunities for using the equipment for other services. It enables transporters to reduce costs of transport execution, for example through reduced administrative expenses, through better route management which lowers cost incurred for fuel and minimizes noise and air pollution. The preferred embodiment enhances transport business operations by providing an efficient means to offer customer discounts to attract business, through reliable receipt of customer payment, through a centralized system for implementing security of both its employees and its customers, through provision of improved equipment to print, issue and confirm transport tickets so as to minimize the potential for ticket misuse or improper manipulation.

The present invention serves the transport companies, their customers and society by implementing a centralized registration and verifying the identity of the persons seeking and providing such services. Such registration and verification minimizes the potential for crime in providing and using transportation services. It enables greater control to prevent improper manipulation of vehicles and auxiliary equipment used in providing transportation services. Further, by centralizing data on a variety of modes of transportation, the present invention enables quickly solving problems that arise when one mode is affected by a disabling event, such as a workers' strike, and then enables immediate identification of available alternatives, improving the flow of commerce.

Accordingly, the present invention will serve to improve the prior art by enabling optimized selection of transportation services. It provides the means to consider all of the important variables affecting prompt and reliable service by a transport company.

BRIEF SUMMARY OF THE INVENTION

The invention is a method for managing the operation of a transportation system for persons or goods implemented by a single administrative office, which enhances security and efficiency. A transportation system has a plurality of transporters or carriers by land, air and sea. In the method of the preferred embodiment, all participants including passengers, shippers of goods and transporters, are registered. Registration records business and personal identity confirming information. Identification documentation for each registered person is provided. Registered shippers and passengers may make a reservation for transportation services. A security check of each registered person including verifying the identity of each such person and checking for any criminal records associated with that person is made. One or more transporters is then chosen. Selections are then made among chosen transporters when more than one chosen transporter is suitable. The transporter is notified to confirm acceptance of the order by the passenger or shipper. The passenger or shipper is then notified of the transporter and conditions for such transportation services. Finally, payment is received for the transportation services, which may then be conveyed to the transporter.

BRIEF DESCRIPTION OF THE DRAWINGS

The drawing is a block diagram of interactions involved in implementation of the method of the invention.

DETAILED DESCRIPTION

The invention is a method for organizing, administering and operating a transportation system to enhance security and efficiency. The preferred embodiments centralize the administrative functions of securing transportation services with emphasis on handling the fare transport charges and the verifying the credentials and bona fides of the shippers, passengers and transporters' employees, collectively referred to as the participants in a transportation system.

The method of the preferred embodiment employs a single administrative office to manage the operation of a transportation system for persons or goods. The transportation system typically has a variety of transporters for land, sea, or air transportation of persons or goods. The method involves scheduling, enhancing security and conducting administrative tasks in the transportation of persons or goods. In referring to the drawing, the single administrative office is referred to as the combined or common transportation head office, or simply the C.T. head office (11). Integrated with the C.T. head office is a verification centre (12) that ensures security related to transportation services. Reference to the C.T. head office (11) includes reference to the verification centre (12).

A first function or step in the method of the preferred embodiment implemented by the C.T. head office is registering persons using the system including any transporters of goods or services (14) and any person seeking transportation services (15). Essentially, all of the participants in a transportation system using this system are first registered with the C.T. head office. Registering persons, or registration of persons, optionally involves a contractual commitment between such persons and the C.T. head office to either use the C.T. head office for, or subsequently report to the C.T. head office on, their transportation transactions, i.e., the transportation details of a transaction conducted directly between the transporter and a passenger or shipper.

Registering a transporter (14) means receiving business information, typically including registry of means of transport (3) offered by the transporter, business location, local authorities (6), accident and rescue system (7), governmental tax office (8), insurance providers (9), insurance regulatory agency (9), transportation capabilities (2), state transport authority (5), state police (4), background information about employees on any complaints, criminal record (1), licenses, restrictions on licenses, administrative fines and punishments, and interactions with law enforcement and other authorities.

Registering a shipper or passenger (15) includes receiving personal information to confirm identity and payment information. Personal information may include name, address, passport number, driver's license number, eye, voice and finger prints, DNA, photograph, and payment information. Registration enables the C.T. head office to keep a pre-paid reserve account for a passenger and shipper from which the passenger or shipper may pay the transport charges. Registration diminishes the importance of a travel ticket by providing for the credentialing of the person before traveling.

Registration of both the shipper or passenger and the transporter promotes the safety and effectiveness of the transport system by enabling identity verification methods of the passenger or shipper and also of the technical capabilities of the means of transport, such as vehicle capabilities, train car capacities, number of seats, etc. The combination of an administrative office and a verification centre enables registration to deliver greater confidence in trustworthy participants and simplifies payment for the transport charges. Having a central administrative office for a plurality of transporters is a type of cost sharing that expands the potential to accept all manner of payment, including debt or third party guaranties that may be provided by the passenger or shipper to the C.T. head office.

The C.T. head office archives and evaluates the registration information it receives, and it is typically included in a data base to permit fast and accurate processing and elaboration of the data when needed. Evaluation may simply mean confirming transportation credentials of a transporter. For example, a transporter typically has a license for using his means of transport and registration enables confirmation of this license.

The registration process enables the C.T. head office contract with a transporter to include benefits or incentives for meeting published transport conditions, such as schedule and route compliance. The benefits, for example, may include cash, driving fuel, and discounts for other costs. Penalties for poor performance may also be included in a contract with a transporter.

Similarly, the registration process enables the C.T. head office to contract with passengers or shippers to include sanctions for not meeting obligations agreed to in reserving transport. Safety and reliability is enhanced by saving data on the routes of transporters and passengers that executed the transport or carriage.

Contract sanctions or rewards may only be included in due regard to the external rules and regulations of a country in which the transport transaction is carried out.

A second function or step in the method of the preferred embodiment implemented by the C.T. head office is providing identification documentation for each registered transporter and each registered person.

A third function or step in the method of the preferred embodiment implemented by the C.T. head office is accepting a reservation for transportation services from any registered person;

A fourth function or step in the method of the preferred embodiment implemented by the C.T. head office is performing a security check of each registered person including verifying the identity of each such person and checking for any criminal records associated with that person. This step is performed by the verification centre (12) of the C.T. head office (11) using any of the available verification methods (16). For any passenger, shipper or transporter this means examining the identification card provided to the person, examining the person's electronic signature, comparing a PIN number or password used by the person with an authorized PIN number, using an eye, voice or finger print or the DNA record of the person compared with that on file, or performing a photograph comparison and using a camera to compare file records with current appearance.

A function of the security check is, for example, to find limitations and qualifications of a driver of a vehicle used for transportation of persons or goods. This requires checking with appropriate authorities and institutions. Such a check would typically include confirming the validity of an operator's license for the type of vehicle, such as an automobile, airplane, or ship, so used.

The security check optionally involves verifying the validity of transporters stated capabilities for its means of transport and of the technical certificate of the vehicle from police, tax office or a competent authority.

The security check optionally involves checking criminal record and traffic infractions of transporters and passengers or shippers from the authorities or using a central criminal record database.

The security check optionally involves checking the validity of the transporter's insurance from the insurance provider or from a regulatory agency of insurers or other competent authority.

A function of verification centre is to elaborate and evaluate information received from transporters, passengers or shippers, authorities, insurers, and others. Such information includes on-time performance of a transporter, a transporter's observance of rules, date and time of transport. The results from such elaboration and evaluation are used to assess the capability of the participants to make use of this transport system.

The verification centre (12) typically communicates with the shipper or passenger (15), transporter or carrier (14), and the employee operating the transporter means of transport (18) using direct person to person contact or indirect contact using available services (13), such as a mobile phone, land line telephone, the Internet, facsimile, a satellite system, text messaging commonly referred to as Short Message Service (sms) and Multimedia Messaging Service (mms), e-mail and mobile Internet.

In alternative embodiments of the invention, the C.T. head office, using the verification centre, implements a more active role in monitoring and communicating with the transporter while providing its transportation service. Such a role includes monitoring route conditions and transport regulations in different jurisdictions; communicating with the transporter about traffic conditions and changing transport regulations; and, providing a communication service for the transporter in contacting police, rescue, or others in case of an accident or emergency situation.

A fifth function or step in the method of the preferred embodiment implemented by the C.T. head office is choosing one or more transporters by comparing and logically searching the reservation for transportation services with the information obtained during registration on the preferences of the person making the reservation and the capabilities of each transporter. This step matches compatible transporter routes and times with the passenger or shippers requirements made known in the accepted reservation. A logical search of the information obtained on registered persons is performed to implement this step.

The step of choosing one or more transporters may be controlled by pre-selection of the passenger or shipper. Pre-selection involves situations where a passenger or shipper has already decided which transporter is desired for the required transportation services, either independently of, or by pre-arrangement with, the transporter. The passenger or shipper tells the C.T. head office what transporter is desired and the choosing step is in accordance with the requirements of the passenger or shipper. While the transporter and passenger might decided to conduct their transaction independently of the C.T. head office, the C.T. head office would perform the security check, provide incentives and conduct its other functions when the transaction is placed through the C.T. head office. When the transaction is conducted independently of the C.T. head office, the contract between the transporter and the C.T. head office and the contract between the C.T. head office and the passenger or shipper would typically require the participants to send a record of the transaction and performance of the transporter to the C.T. head office for use by the verification centre. Sending a record of the transaction and performance of the transporter to the C.T. head office for transactions undertaken independently of the C.T. head office enhances the system by adding data for archiving and evaluation purposes.

A sixth function or step in the method of the preferred embodiment implemented by the C.T. head office is selecting among chosen transporters when more than one chosen transporter is suitable to provide the transportation services, wherein such selecting is performed by the person making the reservation or by the administrative office. When there is more than one transporter capable of meeting the preferences of the person seeking transportation services, the person making the reservation is given the option to state a preference. If that person has no preference, the C.T. head office makes the selection.

A seventh function or step in the method of the preferred embodiment implemented by the C.T. head office is providing an order for transportation services to said one or more chosen transporters consistent with the reservations and the security check. Typically, an order is placed if the transporter meets the passenger or shipper's requirements for transportation, if the party making the reservation pays the C.T. head office for the transport charges, and if the identity of the participants is verified.

This step satisfies an important task of the C.T. head office to identify the passenger's or shipper's payment. Use of the C.T. head office expands on the potential to work with a passenger or shipper to identify credit and other sources of payment. These might include payment only from a personal checking account, the use of standard payment orders, mobile phone orders, Internet orders, payment from a reserve account, in-person payment at the assigned places, payment by post, payment using financial assets, payment using a fidelity bonus, payment on credit with repayment on a schedule, etc.

A eighth function or step in the method of the preferred embodiment implemented by the C.T. head office is confirming acceptance of the order by said one or more chosen transporters. The transporter typically confirms either passenger carriage or shipment of goods, and the price, method of transport, date, time and route.

A ninth function or step in the method of the preferred embodiment implemented by the C.T. head office is notifying each registered person seeking transportation services of said one or more chosen transporters and of conditions for such transportation services. Such notification relates mainly to data on the transportation meeting the reservation requirements and the details of the services, e.g. the transporter (carrier) number, identification codes of the means of transport, date and time of the transportation, the route, remuneration for the transport, etc.

An tenth function or step in the method of the preferred embodiment implemented by the C.T. head office is receiving payment for the transportation services.

EXAMPLE 1

Transporter (14) and a passenger or shipper (15) register themselves in the C.T. head office (11) and obtain an identification cards. In the registration process, the transporter (14) provides all required data on its means of transport (18), which it will use in providing its service. Similarly, the passenger or shipper (15) provides all required data involving personal identity and, if transportation of goods (17) is involved, the kind of transported goods to be consigned.

The registered passenger or shipper (15) informs the C.T. head office (11) about a requirement for transport, specifies the date and time, the boarding point or place of embarkation, the destination, desired means of transport (18) and the goods for consignment (17) if a shipment is required. The passenger or shipper (15) identifies himself to the C.T. head office (11) in the form of electronic signature and password through e-mail. The registered transporter (14), who is chosen by the C.T. head office (11), replies to the C.T. head office (11) confirming the planned carriage; specifies means of transport (18), the route, time of departure and expected time of arrival, number of free transport places, and other data relevant the transportation ordered. The transporter (14) identifies himself using the identification card (16) issued by the C.T. head office and the password by communication (13) using a mobile telephone. The C.T. head office (11) saves and evaluates the data, the verification centre (12) verifies identity of the transporter (14) and capability of the means of transport (18) proposed for transport execution.

The C.T. head office (11) informs the passenger or shipper (15) by communication (13) using a by telephone phone about the transport, which meets the passenger or shipper's reservation criteria, states the fare, provides any conditions required by the transporter, and asks for and receives payment. The C.T. head office (11) confirms the payment and informs the transporter (14) about completion of the order. The transporter (14) sends a binding commitment to the C.T. head office (11) that may be used to send to the participants confirming the agreed upon transport. After conclusion of the transport, the transporter (14) informs the C.T. head office (11) about its execution. The C.T. head office (11) informs the transporter (14) about any benefits for prompt transport execution or penalties in failing to meet published transport conditions. The C.T. head office (11) saves and evaluates data associated with the transportation event.

EXAMPLE 2

A transporter (14) and passenger (15) have already registered themselves in the C.T. head office (11); each of them has an identification card (16) issued by the C.T. head office. Each has already read and understood the conditions for use of this system. At a established ticket office, the passenger (15) makes an agreement with the transporter (14) about transport to a destination by the transporter's means of transport (18). Both the transporter (14) and the passenger (15) confirm their identity using data from the identification cards issued to them by the C.T. head office. The transporter (14) informs the C.T. head office (11) by communication (13) through mobile phone in the form of Multimedia Messaging Service about the route, date and time of the transport agreed and identification codes of the passenger (15); the passenger (15) provides information by communication (13) in a similar way. The C.T. head office (11) processes the received data, verifies the participants and the state of account of the passenger (15). The office consequently informs the transporter by communication (13) through Short Message Service to his mobile phone that the passenger (15) and the payments have been verified.

INDUSTRIAL APPLICATION

This invention may be used to manage all kinds of transport where it is necessary and convenient to perform verification of payment for transport charges in combination with identity verification of the participants. Utilization is especially suitable in the transport of persons or goods.

The invention claimed is:

1. A method for managing the operation of a transportation system for persons or goods, said system having a plurality of transporters and said method implemented by a single administrative office comprising the steps of,
   (a) registering persons involved in a transportation system including transporters of goods or services and any person seeking transportation services wherein registering includes recording transporter information selected from a group consisting of business location, local authorities, state transport authority, state police, accident and rescue system, governmental tax office, insurance providers, insurance regulatory agency, transportation capabilities, and background information about employees on any complaints, criminal record, licenses, restrictions on licenses, administrative fines and punishments, and interactions with law enforcement and other authorities, and wherein registering includes recording personal information about each person seeking transportation services, said personal information selected from a group consisting of name, address, passport number, driver's license number, and employer and payment information;
   (b) providing identification documentation for each registered transporter and each registered person;
   (c) accepting a reservation for transportation services from any registered person;
   (d) performing a security check of each registered person including verifying the identity of each such person and checking for any criminal records associated with that person;
   (e) choosing one or more transporters by comparing and logically searching the reservation for transportation services with the information obtained during registration on the preferences of the person making the reservation and the capabilities of each transporter;
   (f) selecting among chosen transporters when more than one chosen transporter is suitable to provide the transportation services, wherein such selecting is performed by the person making the reservation or by the administrative office;
   (g) providing an order for transportation services to said one or more chosen, or chosen and selected, transporters consistent with the reservation and the security check;
   (h) confirming acceptance of the order by said one or more chosen transporters;
   (i) notifying each registered person seeking transportation services of said one or more chosen transporters and of conditions for such transportation services; and,
   (j) receiving payment for the transportation services.

2. The method of claim 1 further comprising the steps of monitoring route conditions and transport regulations in different jurisdictions; communicating with the transporter about traffic conditions and changing transport regulations; and, providing a communication service for a transporter in contacting police, rescue, or others in case of an accident or emergency situation.

3. The method of claim 1 wherein registering persons involved in a transportation system includes a contractual commitment between such persons and the single administrative office to either use the single administrative office to arrange their transportation transactions or to subsequently report to the single administrative office on the transportation details of a transaction conducted directly between the transporter and a passenger or shipper.

4. The method of claim 1 wherein registering a transporter includes a contractual commitment between such transporter and the single administrative office specifying benefits to the transporter for meeting published transport conditions, or penalties for failing to meet published transport conditions.

5. The method of claim 1 wherein registering a passenger or shipper of goods includes a contractual commitment between such passenger or shipper of goods and the single administrative office specifying sanctions for not meeting obligations agreed to in reserving transport.

6. The method of claim 1 wherein registering persons involved in a transportation system includes keeping a pre-paid reserve account for any passenger and shipper from which said passenger or shipper may pay the transport charges.

7. The method of claim 1 wherein the step of performing a security check further includes verifying identity by a method selected from a group consisting of correlating the identification documentation of each person seeking transportation services with the information; verifying any electronic signature submitted by such person, reviewing any such person's Personal Identification Number code, checking any such person's voice prints, eye prints, finger prints, and genetic DNA code, comparing each such person with a verified photograph of such person, and comparing a verified image of such person with a camera scan.

8. The method of claim 1 wherein the step of confirming acceptance of the order by the transporter and the step of notifying each registered person of the transporter and conditions for such transportation services is performed by a method selected from a group consisting of direct person to person communication and indirect communication services.

* * * * *